United States Patent [19]

Jou et al.

[11] Patent Number: 4,776,356
[45] Date of Patent: Oct. 11, 1988

[54] COSMETIC APPLICATOR

[75] Inventors: Matsayuki Jou; Mitsuhiko Sakamoto, both of Tokyo, Japan

[73] Assignee: Yukigaya kagaku Kogyo Kabushiki-kaisha, Tokyo, Japan

[21] Appl. No.: 945,690

[22] Filed: Dec. 23, 1986

[30] Foreign Application Priority Data

Feb. 1, 1986 [JP] Japan .................................. 61-20534

[51] Int. Cl.$^4$ ............................................. A45D 40/26
[52] U.S. Cl. .................................. 15/244.4; 264/45.5; 264/321; 264/DIG. 14; 132/320
[58] Field of Search ........................ 132/88.7, DIG. 3; 264/45.1, 48, 321, DIG. 14, 45.5; 401/207; 15/244 C

[56] References Cited

U.S. PATENT DOCUMENTS

| | | | |
|---|---|---|---|
| 1,939,612 | 12/1933 | Rose | 401/207 |
| 2,190,376 | 2/1940 | Daley | 264/51 |
| 2,204,202 | 6/1940 | Zimmerman | 15/244 C |
| 2,204,203 | 6/1940 | Zimmerman | 15/244 C |
| 2,327,001 | 8/1943 | Schott | 264/321 |
| 3,386,877 | 6/1968 | Skochdopole et al. | 264/321 |
| 3,582,502 | 6/1971 | Farrow et al. | 264/50 |
| 3,816,233 | 6/1974 | Powers | 264/48 |

FOREIGN PATENT DOCUMENTS

| | | |
|---|---|---|
| 53-9397 | 1/1978 | Japan . |
| 53-153592 | 11/1978 | Japan . |
| 55-13637 | 2/1980 | Japan . |
| 0059236 | 4/1983 | Japan .................................. 132/88.7 |
| 0008802 | 3/1985 | Japan .................................. 132/88.7 |

OTHER PUBLICATIONS

The Condensed Chemical Dictionary, c. 1981, 10th ed., pp. 17, 730.

Primary Examiner—Gene Mancene
Assistant Examiner—Michael Lynch
Attorney, Agent, or Firm—Stevens, Davis, Miller & Mosher

[57] ABSTRACT

This invention concerns cosmetic applicators for low-viscosity liquid cosmetics. In particular, it relates to an applicator surface consisting of a latex foam having a combined structure including closed cells and open cells. The structure has a porosity for the open cell portion increasing from the area adjacent the closed cells toward the other side of the latex foam applicator. The latex foam can be natural or acrylonitrile-butadiene latex foam.

5 Claims, 5 Drawing Sheets

COSMETIC APPLICATOR

FIELD OF THE INVENTION

This invention concerns cosmetic applicators particularly an applicator for low-viscosity liquid cosmetics.

BACKGROUND

Various types of applicators exist for applying liquid cosmetics. Before applying them, an applicator is required to hold an appropriate volume, but not to be impregnated with too much cosmetic.

Japanese Utility Model Publication No. 113673/79 teaches an applicator in which a open cell body is attached over the surface of an closed cellular foam and used as the applicator surface of a puff.

In Japanese Utility Model Publication No. 114711/81, an applicator has an applying surface with a liquid penetration preventive film over the surface of a foam, and, on top of the film, an impregnable foam layer and a flocky layer.

Japanese Utility Model Publication No. 70006/80 teaches a liquid cosmetic applicator made from urethane foam, which has been adjusted through heating and compression to have suitable density, rigidity and surface conditions for viscosity of cosmetics.

However, the first mentioned applicator, though it can prevent penetration of cosmetic liquid by its closed cell layer, absorbs too much low-viscosity cosmetic because its applicator part has a open cell structure. It supplies an excessive volume of cosmetic to the skin; and as a result, it dissolves those previously applied and precludes multiple applications. In the second mentioned application, when its flocky surface layer is impregnated with liquid cosmetics, the piles do not only become less adhesive and fall off, but also their upright fibers draw stripes of cosmetic on the skin preventing uniform application. The third applicator mentioned has improved the defects of the other applicators, but it can not completely prevent the penetration of cosmetic liquid due to its three-dimensional net structure peculiar to urethane foam, even if it is compressed to the maximum (about 90%). During prolonged use, cosmetics will penetrate inside requiring the applicator to be discarded. Further, when the puff is washed, the water absorbed therein is not easily dried providing a location for mold or bacteria.

These conventional applicators are so disadvantageous they when they succeed in preventing penetration of cosmetics, they have problems in use or with make-up effects; and when satisfying that, they fail to prevent penetration completely. An object of this invention is to provide a liquid cosmetics applicator which prevents penetration as well as has optimum applicator surface, specific gravity, rigidity and pore ratio suitable for the characteristics of cosmetics. The present invention solves the problems posed by conventional applicators.

SUMMARY OF THE INVENTION

This application relates to a cosmetic applicator comprising an applying surface comprising a latex foam having a combined structure with an closed cell part and a semi-open cell part, the structure having a porosity of the semi-open cell part increasing from the area adjacent to the closed cell part toward the other side of the latex foam.

This application further relates to a cosmetic applicator comprising an acrylonitrile-butadiene latex foam which has a first surface and another surface, the first surface includes substantially closed cells forming a skin of latex foam, the other surface includes open porous cells, and the porosity of the latex foam increases from the first surface toward the other surface.

In the figures, numeral 1 denotes the heated and compressed surface, 2 the closed cell part, 3 the non-heated compressed surface, and 4 the semi-open cell part.

DETAILED DESCRIPTION

Figure 1:
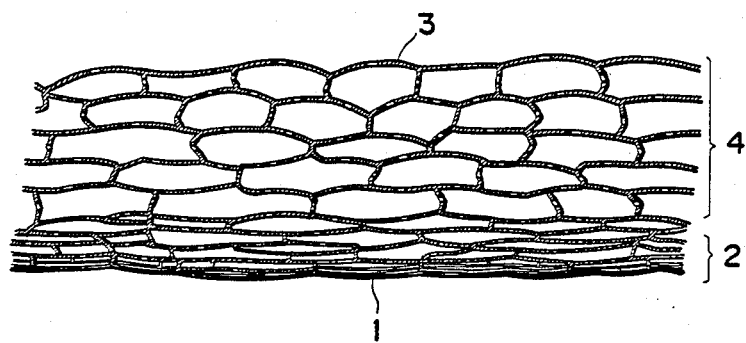
FIG. 1 shows a general sectional view of the applicator of this invention.
Figure 2:
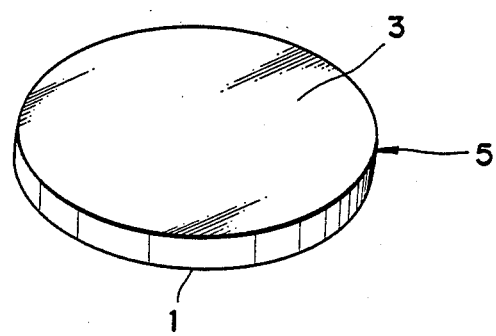
FIG. 2 shows a perspective view.

Thus, this invention relates to a cosmetic applicator 5 made from natural or acrylonitrile-butadiene (N.B.R.) latex foam. It is compressed and heated from one side by a thermal processing device so that the material may, as shown in FIG. 1, have the substantially closed, non-porous cell area or skin at the heated and compressed side 1 and have the semi-open porous cell area at the other side. The cells have a porosity gradually increasing toward the other non-heated compressed side 3.

Figure 3:
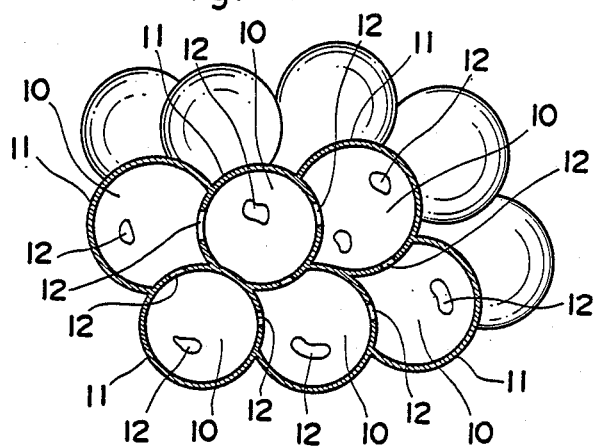
FIG. 3 shows an illustration of the cell structure of latex foam according to this invention.

Unlike the three-dimensional net structure of urethane foams, natural or N.B.R. latex foam has open cells. In such structures, cells 10 are formed each on top of another; and the wall 11 of each cell 10 is broken here and there providing pores 12 through which adjacent cells 10 communicate with one another. This is shown in FIG. 3.

Therefore these pores 12 in the walls 11 of cells 10 can be substantially closed. The cells 10 can be substantially closed by relatively low heating and compression rates, as shown by the experimental values mentioned later, permitting the cells to close, preventing penetration of cosmetic liquid. Because both requirements of heating and compression must be satisfied to compress and fix this foam, the cell porosity can be made to gradually increase toward the non-heated compressed side 3 by selecting the proper temperature and time.

When material processed this way is used as a cosmetic applicator, cosmetic does not penetrate into the closed cell part, but does into the semi-open cell part. But when cosmetic is applied to the skin, this part does not supply them excessively because of its semi-open structure.

This compressed foam with the above construction can be adjusted using its porosity (the content of cosmetics), elasticity (the ease to use the applicator) and the surface conditions by adjusting the density, the cell diameter, the compression ratio and the heating conditions for the raw material. This latex foam provides a wide range of temperature for heating and compression to soften its surface. Heating it within this temperature range neither substantially deteriorates its quality, nor deprives it of its elasticity.

Generally, when the heated compressed surface 1 is used to apply relatively low-viscosity liquid cosmetics, it has the same make-up effects as if the cosmetics are applied by finger. Further, it can completely prevent the penetration of cosmetics into the applicator 5.

When the compressed surface 3 having the semi-open cells 4 is used to apply relatively high-viscosity creamy cosmetics, it gives the same make-up effects and comfort feeling as the non-compressed N.B.R. latex foam gives. But, it permits no unnecessarily large amount of cosmetic to enter applicator 5.

Some embodiments according to this invention will hereinafter be described.

The acrylonitrile-butadiene latex is added some conventional vulcanization agent, sub-agent and accelerator, age resistor and heat plasticizer, mixed with air and stirred. Then, the foam material having foamed or expanded five times as large as the latex content is shaped into a sheet. This is followed by vulcanizing, washing and drying it into a 20 mm thick N.B.R. latex foam sheet with 0.25 specific gravity. Its skin is removed. It is sliced into a 10 mm thickness. Then both of its sides are heated and compressed 65% using a conventional electric heating press. Its temperature has been adjusted to 170° C., so that a 4.2 mm thick compressed N.B.R. latex foam sheet is obtained 15 minutes later. When this sheet is sliced at the center, it is found that the heated compressed surface had closed cells while the sliced surface had the structure of a semi-open and semi-compressed cells. This surface has a suitable elasticity and felt comfortable.

Figure 4:
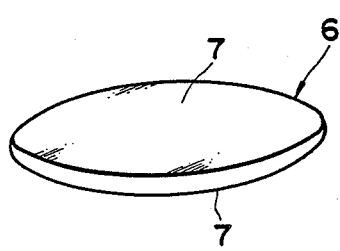
FIG. 4 shows a puff according to this invention.

Further this sheet is cut into circular shapes and processed. Then two circular sheets are put one upon another with their heated compressed sides placed back to back, and then welded together by a high-frequency welder into the puff 6. This is shown in FIG. 4. The outer circumference of this puff 6 is covered with the semi-open and semi-compressed cells 7.

When this puff 6 embodying this invention is used as the applicator of a liquid foundation with a viscosity of about 50 cps, it is found that the applicator has a desirable amount of cosmetic, and the cosmetic that had been absorbed in the semi-open cell part did not move to the skin so rapidly as when a sponge with open cell is used, but did gradually as the applied force increased, permitted even application of the cosmetic as well as multiple applications. This produces a good make-up effect.

After a quantity of liquid foundation (15 g) is used up, the puff 6 is cut and the penetration of the liquid foundation investigated to find that the penetration is completely stopped in front of the closed cell part.

EXAMPLE

The N.B.R. latex foam sheet with a specific gravity of 0.15, a thickness of 15 mm and a mean cell diameter of 150 micron is compressed 70% by an electric press and heated from one side at 170° C. for 5 minutes to obtain a 6 mm thick, compressed N.B.R. foam sheet.

Three sheets each with 2 mm in thickness obtained by slicing this sheet are:
A. The sheet including the plane having directly contacted the heating surface.
B. The sheet including the part the closest to the heating surface next to the sheet A.
C. The sheet including the part the remotest from the heating surface.

A penetrability test is made, in which five samples with 20 mm diameter are taken out from each sheet. Conventional ink 22 with a viscosity of 35 cps is placed on the surface of 20a of the sample 20, sucked by a force of 1 kg/cm$^2$ and its transmission to the reverse side 20b of sample 20 examined using the test apparatus shown in FIG. 5. The results are shown in the table. A similar test is made on a reference polyurethane foam which was heated at 170° C. and compressed 90% from both sides into a 2 mm thick sheet.

Figure 5:
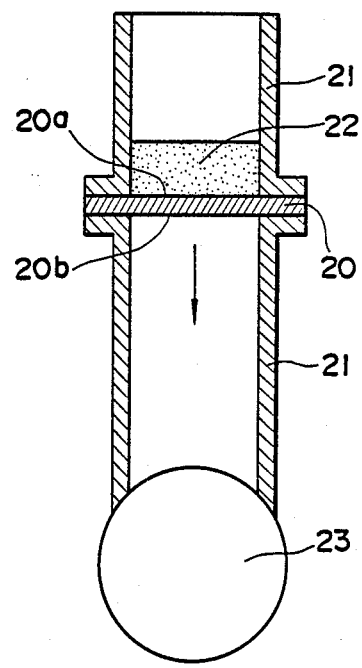
FIG. 5 shows a sectional view of the test apparatus used in the experiment of this invention.
Figure 6:
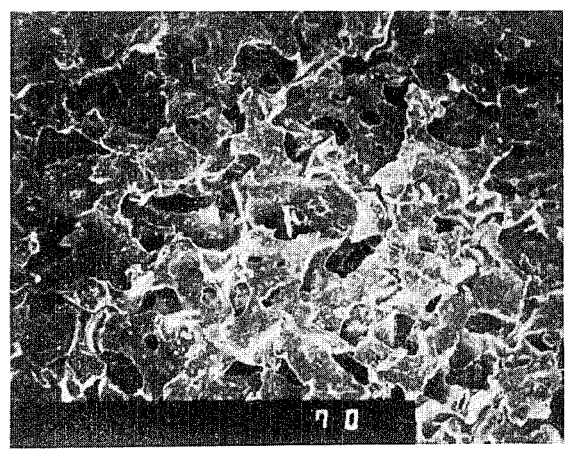
FIG. 6 shows a heated compressed surface.
Figure 7:
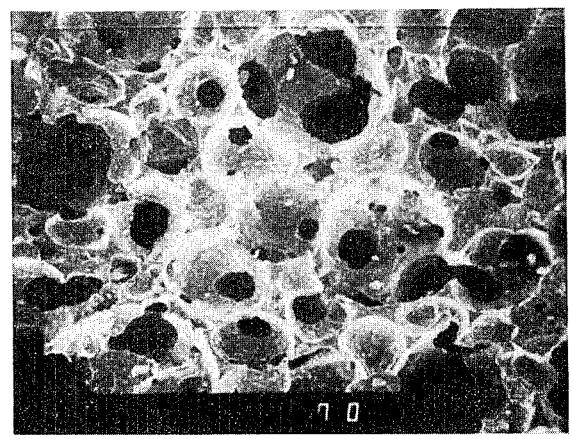
FIG. 7 shows a non-heated compressed surface.
Figure 8:
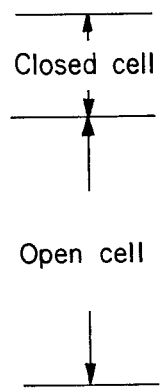
FIG. 8 shows a vertical sectional view.
Figure 8:
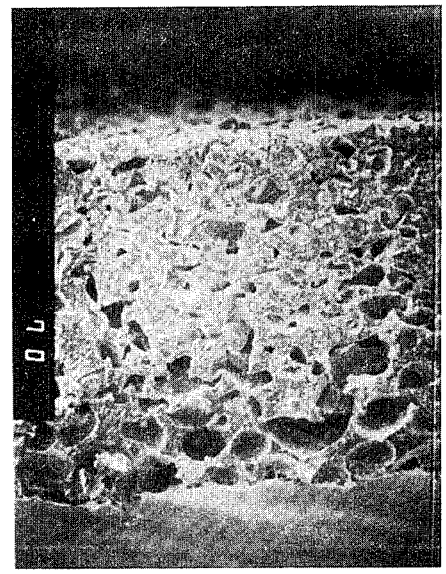
Figure 9:
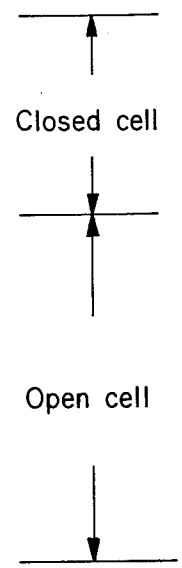
FIG. 9 shows a vertical sectional view.
Figure 9:
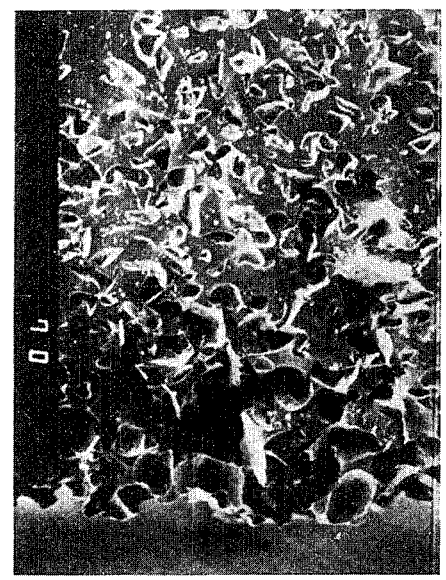
Figure 10:
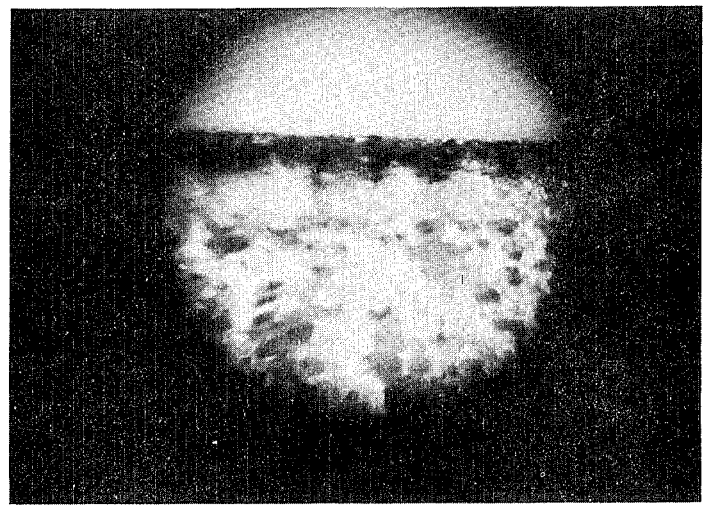
FIG. 10 shows a sectional view of closed cell parts.
Figure 11:
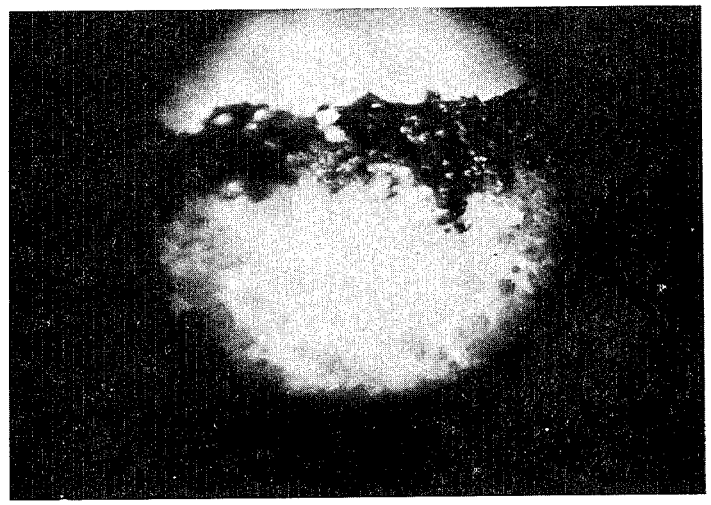
FIG. 11 shows a sectional view of semi-open cell parts.

In FIG. 5, numeral 21 denotes a tube containing the sample 20 and numeral 23 a vacuum pump for sucking the ink.

TABLE

|  | 1 | 2 | 3 | 4 | 5 |
|---|---|---|---|---|---|
| A | o | o | o | o | o |
| B | o | Δ | Δ | Δ | Δ |
| C | x | x | x | x | x |
| Compressed polyurethane | Δ | Δ | x | x | x | o: No ink 22 has transmitted at all to the reverse side 20B of the sample 20.
Δ: Partially transmitted.
x: Completely transmitted.

The results show that penetration did not occur at all in the sheet A containing the plane having contacted the heating surface, partially occurred in the sheet B and fully in the sheet C. It also occurred everywhere in the compressed polyurethane foam which is the reference.

According to this invention, having the above construction, the heated and compressed part can obtain the structure or more perfectly closed cells than when other open cell foams are compressed and fixed. This is a result of heating, compressing and fixing the latex foam to form cells having a unique partition structure. When used as an applicator of liquid cosmetics, the particular latex foam can more efficiently prevent penetration of excessive cosmetic into the applicator.

Further, in the heating and compression, there occur some areas which are compressed but received less heat than others within the same heating time due to a lower heat transfer rate. In these areas, semi-open cells are formed. Their porosity increases with distance from the heated compressed side. In the semi-open cell part close to the closed cell area, many pores in the wall of each cell are closed and the porosity is low. But the part more remote from the closed cells has a greater porosity. Therefore the applicator can contain a desirable amount of cosmetics and does not supply the skin with excessive quantities of cosmetic unlike the structure with open cells. Then according to this invention, it is possible to provide an applicator with an optimum capacity for cosmetics and the best application effects for any liquid cosmetics with a selected viscosity by adjusting the specific gravity, the cell diameter, the compression ratio and heating conditions of the latex foam.

Further conventional thermal processing devices such as the electric press for rubber vulcanization and the high-frequency welder are available for processing this latex foam, which will make easier the mass production of this ideal applier at low cost.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

What is claimed:

1. A cosmetic applicator comprising an open cell latex foam structure modified to have graduated porosity, and an applying surface; said foam structure having a first heat compressed portion comprising closed cells forming an impervious skin, and a second compressed portion comprising semi-open cells; said second portion disposed adjacent the applying surface, and said first portion disposed adjacent said second portion away from the applying surface, with the impervious skin at a surface of the applicator opposite said applying surface whereby the porosity of the applicator gradually increases from the first portion to the second portion.

2. The cosmetic applicator of claim 1, wherein the latex foam is a natural latex foam.

3. The cosmetic applicator of claim 1, wherein the latex foam is an acrylonitrile-butadiene latex foam.

4. A cosmetic applicator comprising an open cell natural or acrylnitrile-butadiene latex foam structure modified to have graduated porosity, and an applying surface; said foam structure having a first heat-compressed portion comprising closed cells forming an impervious skin and a second compressed portion comprising semi-open cells; said second portion disposed adjacent the applying surface, and said first portion disposed adjacent said second portion away from the applying surface, with the impervious skin at a surface of the applicator opposite said applying surface whereby the porosity of the applicator gradually increases from the first portion to the second portion.

5. A method of making a cosmetic applicator having an open cell latex foam structure modified to have graduated porosity and an applying surface, comprising heat-compressing a first portion of an open cell latex foam structure to close open cells forming an impervious skin and a second compressed portion comprising semi-open cells so that the porosity of the latex foam structure gradually increases from the first portion to the second portion, whereby the first portion forms the applying surface and is disposed adjacent the second portion away from the applying surface with the impervious skin at a surface of the applicator opposite the applying surface.

* * * * *